United States Patent
Ciolfe

(10) Patent No.: US 8,910,969 B2
(45) Date of Patent: Dec. 16, 2014

(54) LOW PROFILE SEAT FRAME

(71) Applicant: Motion Concepts Canada, Concord (CA)

(72) Inventor: David Ciolfe, Aurora (CA)

(73) Assignee: Motion Concepts L.P., Concord, Ontario (CA)

( * ) Notice: Subject to any disclaimer, the term of this patent is extended or adjusted under 35 U.S.C. 154(b) by 0 days.

(21) Appl. No.: 14/311,483

(22) Filed: Jun. 23, 2014

(65) Prior Publication Data

US 2014/0300085 A1  Oct. 9, 2014

Related U.S. Application Data

(63) Continuation of application No. 13/786,909, filed on Mar. 6, 2013, now Pat. No. 8,757,655.

(60) Provisional application No. 61/607,278, filed on Mar. 6, 2012.

(51) Int. Cl.
  *B62B 1/00*  (2006.01)
  *A61G 5/10*  (2006.01)
  *B62B 1/12*  (2006.01)

(52) U.S. Cl.
  CPC ............... *A61G 5/1059* (2013.01); *B62B 1/12* (2013.01); *A61G 5/1075* (2013.01)
  USPC ........................... 280/647; 280/650; 280/657

(58) Field of Classification Search
  USPC ........ 280/650, 647, 657, 30, 649, 651, 304.1, 280/250.1; 297/35, 354.1, 311, 312, 297/DIG. 10; 254/7 R, 7 C
  See application file for complete search history.

(56) References Cited

U.S. PATENT DOCUMENTS

| | | | |
|---|---|---|---|
| 3,853,372 A | 12/1974 | Meyer | |
| 4,477,098 A | 10/1984 | Minnebraker | |
| 4,592,562 A * | 6/1986 | Strautnieks et al. | ....... 280/250.1 |

(Continued)

FOREIGN PATENT DOCUMENTS

EP  0361774  4/1990

OTHER PUBLICATIONS

International Search Report dated Sep. 4, 2013, for corresponding PCT Patent Application Serial No. PCT/IB2013/000927.

(Continued)

*Primary Examiner* — John Walters
*Assistant Examiner* — James Triggs
(74) *Attorney, Agent, or Firm* — Calfe, Halter & Griswold LLP

(57) ABSTRACT

A wheelchair includes a chassis, a positioning module, a seat frame, and a seat. The positioning module is mounted to an upper portion of the chassis. The seat frame includes a support member secured to and spanning a seating area of the positioning module and a front frame member secured to a front end of the support member and overhanging a front edge of the seating area of the positioning module, such that the seat frame at least partially straddles the positioning module. The front frame member is connected with and at least partially supports at least one of a side frame member, foot rest, leg rest and arm rest assembled with and supported by the front frame member. The seat is secured to an upper surface of the support member.

20 Claims, 6 Drawing Sheets

(56) References Cited

U.S. PATENT DOCUMENTS

| | | | |
|---|---|---|---|
| 4,650,201 A * | 3/1987 | Hartwell | 280/250.1 |
| 5,669,086 A | 9/1997 | Garman | |
| 5,674,041 A | 10/1997 | Smith, Jr. et al. | |
| 6,540,250 B1 * | 4/2003 | Peterson | 280/657 |
| 6,945,602 B2 * | 9/2005 | Fookes et al. | 297/300.4 |
| 7,988,172 B2 * | 8/2011 | Richter et al. | 280/250.1 |
| 2003/0075967 A1 * | 4/2003 | Ciolfe et al. | 297/423.32 |
| 2005/0087957 A1 * | 4/2005 | Bennett et al. | 280/647 |
| 2007/0278761 A1 | 12/2007 | Firth | |

OTHER PUBLICATIONS

Written Opinion dated Sep. 4, 2013, for corresponding PCT Patent Application Serial No. PCT/IB2013/000927.

International Preliminary Report on Patentability dated Sep. 9, 2014, for corresponding PCT Patent Application U.S. Appl. No. PCT/IB2013/000927.

* cited by examiner

LOW PROFILE SEAT FRAME

CROSS-REFERENCE TO RELATED APPLICATION

This application is a continuation of U.S. Non-Provisional patent application Ser. No. 13/786,909, entitled "LOW PROFILE SEAT FRAME" and filed Mar. 6, 2013, which claims priority to and the benefit of U.S. Provisional Patent Application Ser. No. 61/607,278, entitled "LOW PROFILE SEAT FRAME" and filed Mar. 6, 2012, the entire disclosure of which is incorporated herein by reference.

BACKGROUND

Many conventional wheelchairs are modified to include after-market or third party modular positioning mechanisms installed beneath the seat to provide for adjustable tilting and/or elevation of the wheelchair seat. Upon installation of a positioning module with the wheelchair, a seat frame is assembled on top of the positioning module, resulting in a raised position of the seat frame and an increased seat height on the apparatus.

SUMMARY

The present application discloses exemplary embodiments of a seat frame for use with a seating apparatus, such as, for example, a wheelchair. In one exemplary embodiment, a seat frame is provided in a low profile configuration to reduce overall seat height. In one such embodiment, a low profile seat frame is configured to at least partially straddle a supporting portion of the seating apparatus, such as, for example, a positioning module installed on a wheelchair, thereby reducing the height of the seat frame on the apparatus.

Accordingly, in an exemplary embodiment, a wheelchair includes a chassis, a positioning module, a seat frame, and a seat. The positioning module is mounted to an upper portion of the chassis and is operable to adjust at least one of an angular position and an elevational position of a seating area of the positioning module. The seat frame includes a support member secured to and spanning the seating area of the positioning module and a front frame member secured to a front end of the support member and overhanging a front edge of the seating area of the positioning module, such that the seat frame at least partially straddles the positioning module. The front frame member is connected with and at least partially supports at least one of a side frame member, foot rest, leg rest and arm rest assembled with and supported by the front frame member. The seat is secured to an upper surface of the support member.

In another exemplary embodiment, a low profile seat frame for assembly with a positioning module of a seating apparatus includes a support plate and front, rear, and first and second side frame members. The support plate includes a horizontally extending planar portion defining a seating area and a downward extending front flange disposed along a front end of the planar portion. The front frame member is secured to the front flange of the support plate, and the rear frame member is secured to an upper surface of the planar portion along a rear end opposite the front end. The first and second side frame members each include a front extension arm telescopically received in a corresponding tubular end of the front frame member and a rear extension arm telescopically received in a corresponding tubular end of the rear frame member; wherein the front extension arm of each of the first and second side frame members is vertically offset from the corresponding rear extension arm to accommodate a vertical offset between the front and rear frame members.

In still another exemplary embodiment, a method is disclosed for installing on a wheelchair a positioning module operable to adjust at least one of an angular position and an elevational position of a seating area at least partially defined by an upper surface of the positioning module. In the exemplary method, the positioning module is assembled to a chassis of the wheelchair. A low profile seat frame is provided, and includes a support plate having opposed upper and lower surfaces, a front frame member secured to a front end of the support plate and extending beyond the lower surface of the support plate, and a rear frame member secured to the upper surface of the support plate at a rear end of the support plate. The low profile seat frame is secured to the positioning module, such that the support plate spans the seating area of the positioning module and the front frame member overhangs a front edge of the seating area. At least one of a side frame member, a foot rest, a leg rest, and an arm rest is assembled with the front frame member. A wheelchair seat is secured to the upper surface of the support plate.

BRIEF DESCRIPTION OF THE DRAWINGS

Further features and advantages will become apparent to those of ordinary skill in the art to which the invention pertains from a reading of the following description together with the accompanying drawings, in which.

DESCRIPTION

This Description merely describes exemplary embodiments and is not intended to limit the scope of the specification in any way. Indeed, the invention as described is broader than and unlimited by the exemplary embodiments, and the terms used have their full ordinary meaning.

As described herein, when one or more components are described as being connected, joined, affixed, coupled, attached, or otherwise interconnected, such interconnection may be direct as between the components or may be indirect, such as through the use of one or more intermediary components. Also as described herein, reference to a "member," "component," or "portion" shall not be limited to a single structural member, component, or element but can include an assembly of components, members or elements.

Positioning modules for wheelchairs or other seating apparatuses are often assembled with the apparatus as an aftermarket modification, installed between the chassis and seat frame, for example, to provide for adjustable tilting and/or elevation of the seat frame. Such an installation increases the height of the seat frame on the apparatus. This increased height may result in reduced clearance for the seated user, for example, reduced clearance for the user's legs under tables, desks, and other obstructions.

According to one aspect of the present application, a low profile seat frame is described for use with seating apparatuses, such as, for example, wheelchairs. In one such embodiment, a low profile seat frame is configured to at least partially straddle or overhang a seat supporting positioning module of the apparatus, such as, for example, a seat elevating and/or seat tilting positioning module. This arrangement reduces the height of the seat frame on the seating apparatus by at least partially receiving or overlapping the positioning module with the seat frame. In one embodiment, a wheelchair or other such seating apparatus may be retrofit with a positioning module by removing the seat and seat frame from the chassis, assembling the positioning module to the chassis, assembling the low profile seat frame to the positioning module, and assembling the seat to the low profile seat frame.

Figure 1:
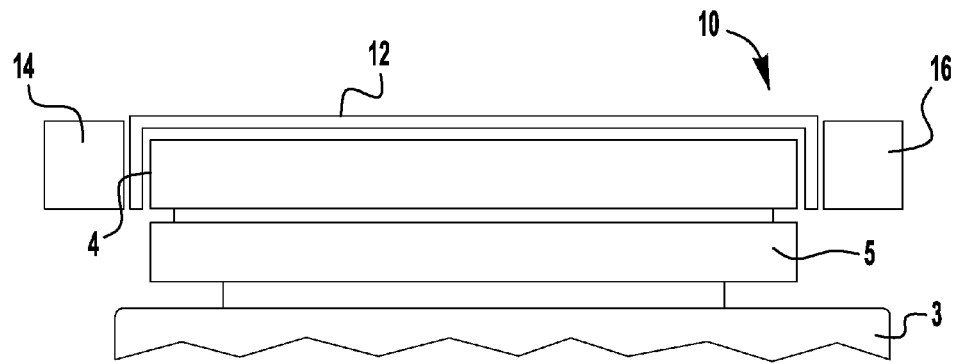
FIG. 1 is a side schematic view of a low profile seat frame assembled with a positioning module in accordance with an exemplary embodiment.

FIG. 1 schematically illustrates a low profile seat frame 10 assembled with a positioning module 5 (or other such structure defining a seating area) of a seating apparatus, in accordance with an exemplary embodiment of the present application. The positioning module is secured to a chassis 3 or other such base of the seating or wheelchair apparatus. The seat frame 10 includes a central support member 12 sized to span a seating area of the positioning module 5, and a front frame member 14 secured to a front end of the support member 12 (e.g., secured to a downward front flange) and positioned to at least partially overhang a front edge or side 4 of the positioning module 5, such that the seat frame 10 at least partially straddles or receives the positioning module 5. In one such embodiment, an upper surface of the front frame member 14 is aligned with or recessed from a upper surface of the support member 12.

The front frame member 14 may be used to support one or more of a seat (e.g., seat pan, seat cushion), leg rests, footrests, arm rests, or other components of the seating apparatus. The support member 12 may be provided as one or more plates, rails, tubes or other such structures. The support member 12 may be provided as a relatively thin, flat component (e.g., a ⅛ inch thick steel plate) to reduce the profile of the seating assembly, while maintaining rigid support for the seat frame 10. The front frame member 14 may be provided as a relatively thick (as compared to the support member) bar, tube (e.g., square or cylindrical tube, e.g., a 1 inch wide/ diameter square/cylindrical tube), or other such component, sized to facilitate the support of and/or connection to other components of the apparatus. By utilizing a support member 12 having a thickness that is less than a thickness of the front frame member 14, the height or elevation of the seat may be reduced, as compared to a seat assembly in which the seat frame is disposed entirely on top of the positioning module.

As shown in FIG. 1, a rear frame member 16 may similarly be secured to a rear end of the support member 12 (e.g., secured to a downward rear flange) and positioned to at least partially overhang a rear edge or side 6 of the positioning module 5, such that the seat frame 10 fully spans a length of the positioning module 5. Like the front frame member 14, the rear frame member 16 may be positioned such that an upper surface of the rear frame member 16 is aligned with or recessed from the upper surface of the support member 12. The rear frame member 16 may be used to support a seat (e.g., seat pan, seat cushion), backrests, armrests, or other components of the seating apparatus. Like the front frame member 14, the rear frame member 16 may be provided as a relatively thick (as compared to the support member) bar, tube (e.g., square or cylindrical tube, e.g., a 1 inch wide/diameter square/ cylindrical tube), or other such component, sized to facilitate the support of and/or connection to other components of the apparatus.

Figure 2:
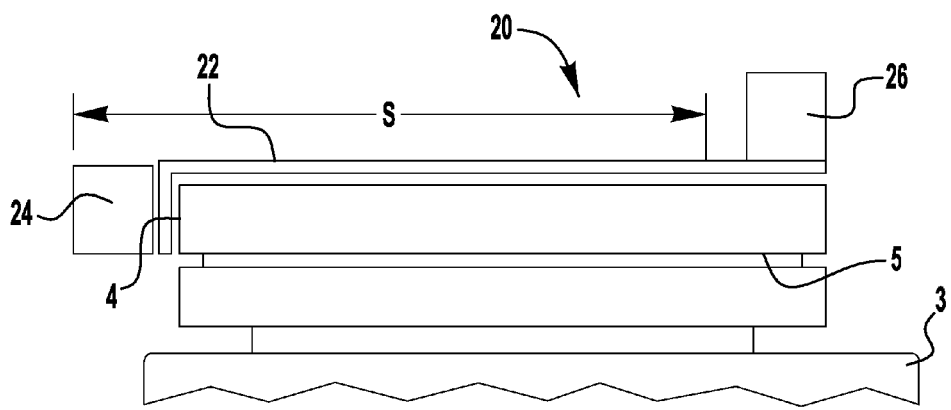
FIG. 2 is a side schematic perspective view of another low profile seat frame assembled with a positioning module in accordance with another exemplary embodiment.

In another embodiment, as shown in FIG. 2, a seat frame 20 may include a rear frame member 26 secured to a rear end of the support member 22 and positioned such that the rear frame member 26 is disposed entirely above the positioning module 5 when the seat frame 20 is installed on the positioning module 5. Because the rear frame member 26 is located behind a seating area S of the seat frame 20, the elevated position of the rear frame member 26 does not affect the height of the seat.

Figure 3:
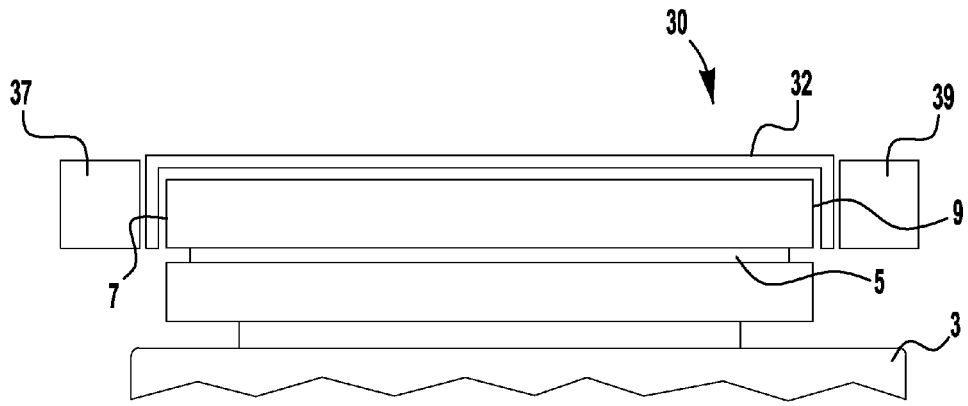
FIG. 3 is a front schematic perspective view of another low profile seat frame assembled with a positioning module in accordance with another exemplary embodiment.

A low profile seat frame may additionally or alternatively include one or more side frame members secured to side ends of a support member. The side frame members may be configured to support a seat pan, armrests, backrests, or other components of a seating apparatus. FIG. 3 schematically illustrates an exemplary low profile seat frame 30 assembled with a positioning module 5 of a seating apparatus, in accordance with an exemplary embodiment of the present application. The seat frame 30 includes a central support member 32 sized to span a width of the positioning module 5, and first and second side frame members 37, 39 secured to first and second side ends of the support member 32 (e.g., secured to downward side flanges) and positioned to at least partially overhang first and second sides or edges 7, 9 of the positioning module 5, such that the seat frame 30 straddles or receives the positioning module 5.

Figure 4:
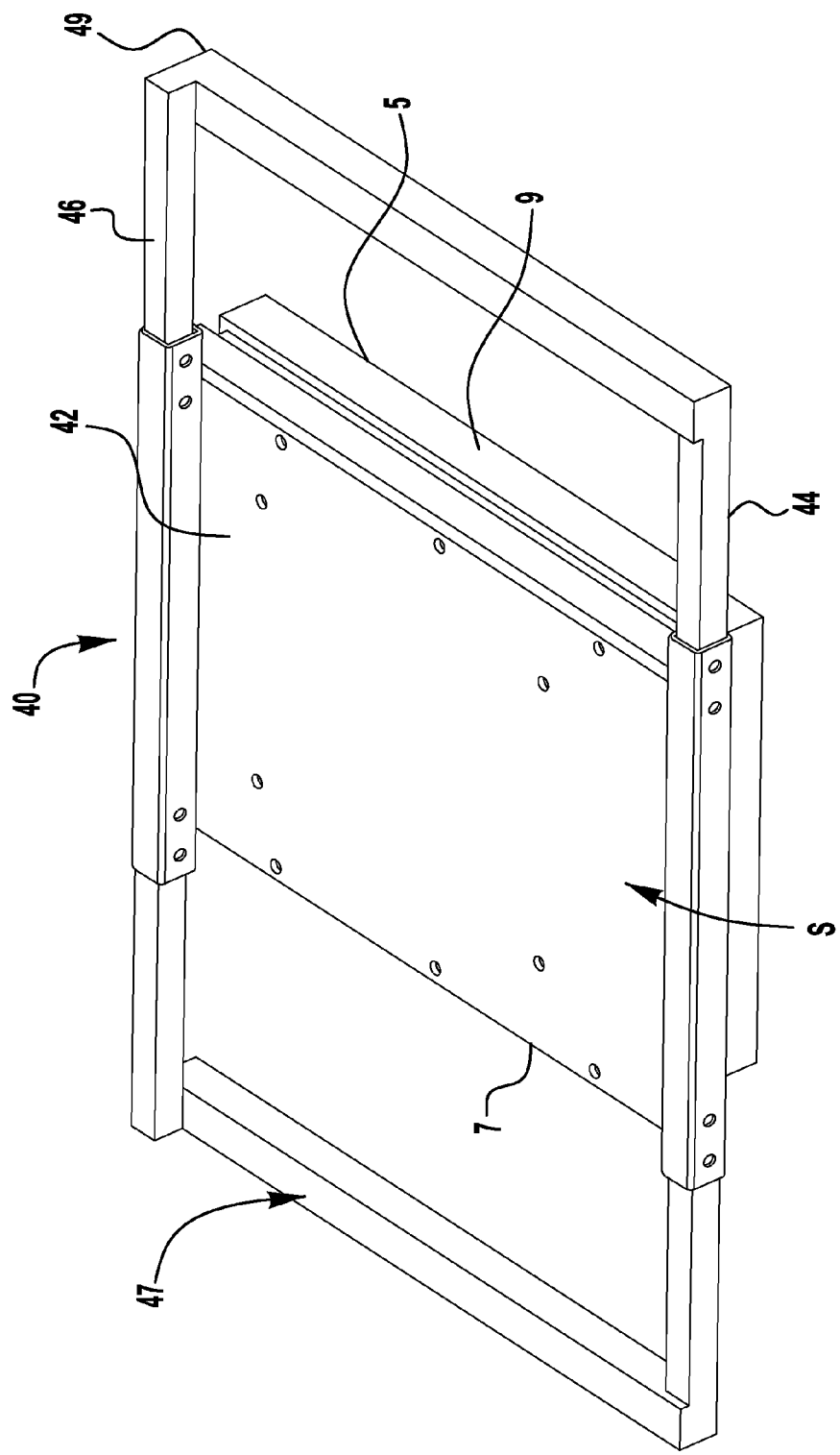
FIG. 4 is an upper perspective view of another low profile seat frame assembled with a positioning module in accordance with another exemplary embodiment.

In another embodiment, one or more side frame members may be detached from a support member and secured to a front frame member and/or rear frame member, for example, to provide rigid support for a seat that is substantially wider than the positioning module. FIG. 4 schematically illustrates an exemplary low profile seat frame 40 assembled with a positioning module 5 of a seating apparatus, in accordance with an exemplary embodiment of the present application. The seat frame 40 includes a central support member 42 sized to span a width of the positioning module 5, and first and second side frame members 47, 49 secured to front and rear frame members 44, 46 and detached (and, optionally, spaced apart) from the support member 42. The side frame members 47, 49 are positioned to at least partially overhang first and second side edges 7, 9 of the positioning module 5, such that the seat frame 40 straddles or receives the positioning module 5.

To provide for adaptability or adjustability of a seat frame (e.g., to adjust a width of the seat frame), side frame members may be detachable and/or adjustable on the front and rear frame members. In one embodiment, the front and rear frame members are hollow or tubular to receive arm extensions of the side frame members in telescoping engagement, to permit adjustment of the width of the seat frame. Fasteners (e.g., bolts, retaining pins) may be installed through mounting holes in the front and rear frame members to secure the side frame members in the selected positions. In another embodiment, side frame members may be provided with hollow arm extensions to telescopically receive ends of the front and rear frame members. Other adjustable arrangements can also be used such as, for example, overlapping brackets and fasteners.

Figure 5A:
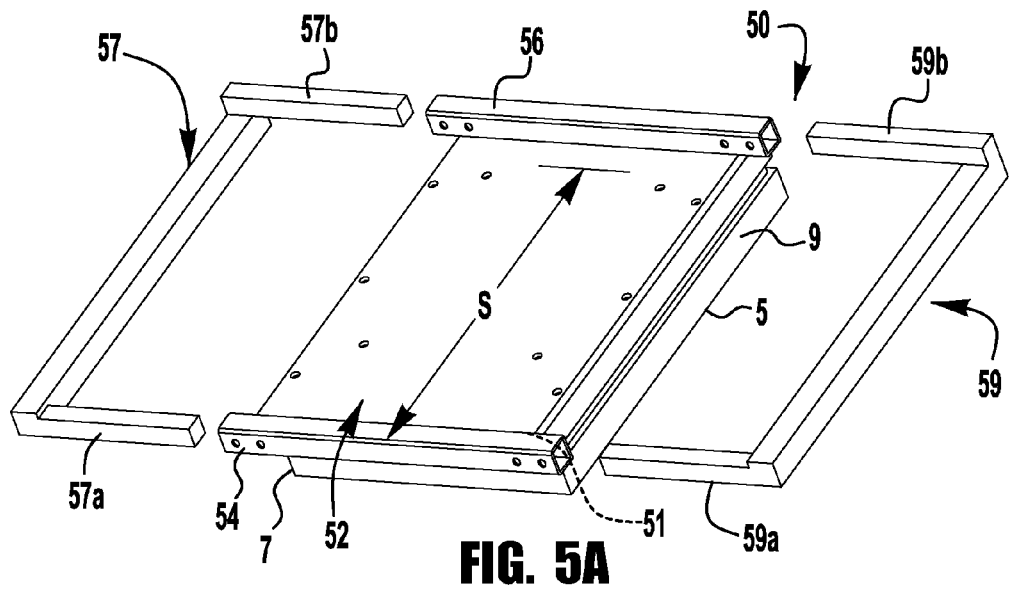
FIG. 5A is an upper perspective view of a low profile seat frame assembled with a positioning module and shown with telescoping side members separated from the seat frame, in accordance with an exemplary embodiment.
Figure 5B:
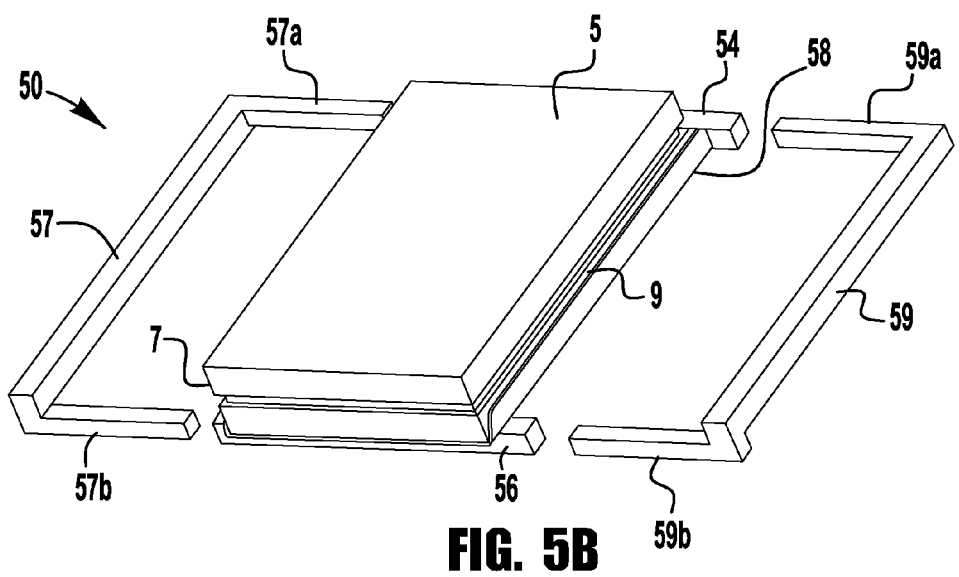
FIG. 5B is a lower perspective view of the seat frame and positioning module assembly of FIG. 5A, shown with the telescoping side members separated from the seat frame.
Figure 5C:
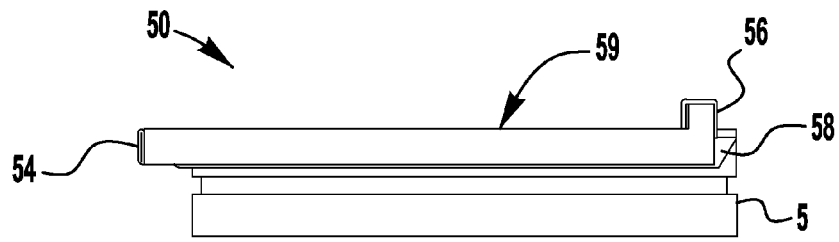
FIG. 5C is a side view of the seat frame and positioning module assembly of FIG. 5A.
Figure 6A:
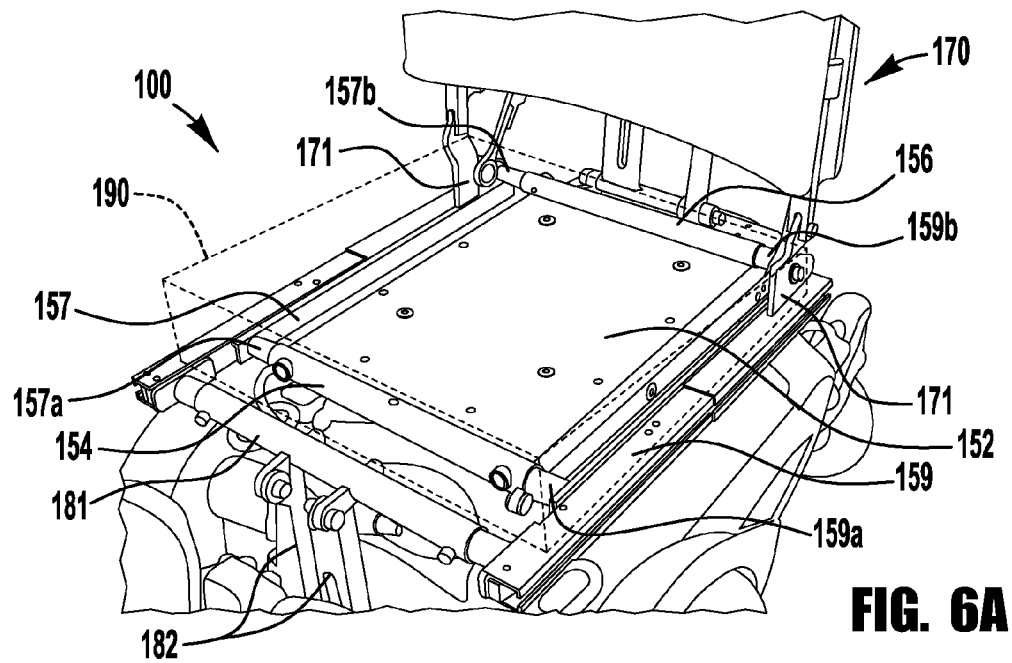
FIG. 6A is a partial perspective view of a wheelchair with a low profile seat frame assembly, in accordance with an exemplary embodiment.
Figure 6B:
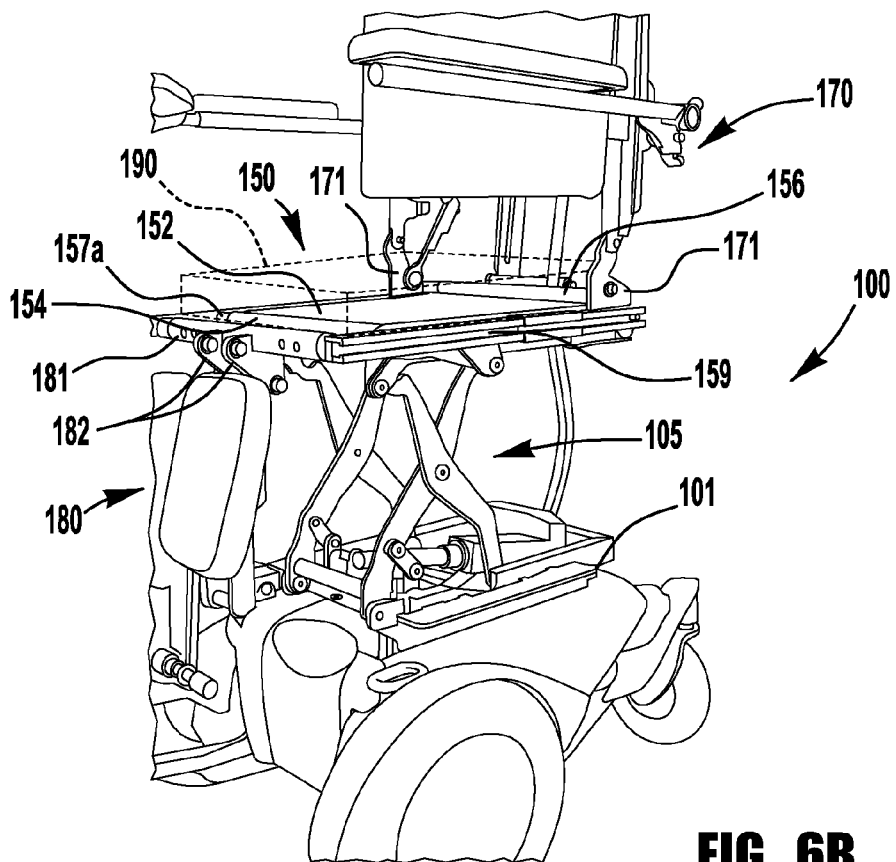
FIG. 6B is another partial perspective view of the wheelchair assembly of FIG. 6A.

FIGS. 5A, 5B, and 5C illustrate various views of a low profile seat frame 50 assembled with a positioning module (shown schematically at 5) for installation on a seating apparatus (e.g., on a wheelchair 100, as shown in FIGS. 6A and 6B), in accordance with an exemplary embodiment of the present application. The seat frame 50 includes a central support plate 52 sized to span a length of the positioning module 5 at least corresponding to a seating area of the seat frame, and a tubular front frame member 54 (e.g., a 1 inch wide square tube) secured to a front end of the support plate 52 and positioned to at least partially overhang a front edge or side 4 of the positioning module 5. While the front frame member 54 may be secured to the support plate 52 using any suitable configuration, the exemplary support plate includes a downward extending front flange 51 that is fastened (e.g., welded or otherwise attached) to the front frame member 54, with an upper surface of the front frame member 54 being substantially aligned with an upper surface of the support plate 52. As shown, the support plate may additionally include downward extending side flanges 58 positioned to closely receive sides or edges 7, 9 of the positioning module 5, for example, to provide additional rigid support of the support plate 52 against lateral movement on the positioning module 5. The support plate 52 may additionally be secured to the positioning module 5 by fasteners extending through mounting holes in the support plate 52 (e.g., fasteners securing a seat pan or seat cushion to the positioning module 5).

The exemplary seat frame 50 includes a tubular rear frame member 56 (e.g., a 1 inch wide square tube) secured to the upper surface of the support plate 52 (e.g., by welding) along a rear end of the support plate 52, beyond the seating area S of the seat frame 50. As a result, the rear frame member 56 is raised or elevated with respect to the front frame member 54.

The exemplary seat frame 50 further includes first and second telescoping side frame members 57, 59 each having front arm extensions 57a, 59a sized and positioned to be received in the hollow or tubular ends of the front frame member 54, and rear arm extensions 57b, 59b sized and positioned to be received in the hollow or tubular ends of the rear frame member 56. To accommodate the offset in elevation between the front frame member 54 and the rear frame member 56, the rear arm extensions 57b, 59b may be similarly offset in elevation with respected to the front arm extensions 57a, 59a, as evident in FIGS. 5A-5C. For example, as shown, the front arm extensions 57a, 59a may be stepped down from an upper surface of the corresponding side frame member 57, 59, and the rear arm extensions 57b, 59b may extend upward from the upper surface of the corresponding side frame member 57, 59. To adjust an overall width of the exemplary seat frame 50, the arm extensions 57a, 59a, 57b, 59b are laterally telescoped within the corresponding front and rear frame members 54, 56 to desired positions, which may, but need not, be substantially symmetrical. To secure the side frame members 57, 59 in these desired positions, fasteners (not shown) may be installed through aligned mounting holes in the front and rear frame members 54, 56 and the arm extensions 57a, 59a, 57b, 59b.

Figure 7:
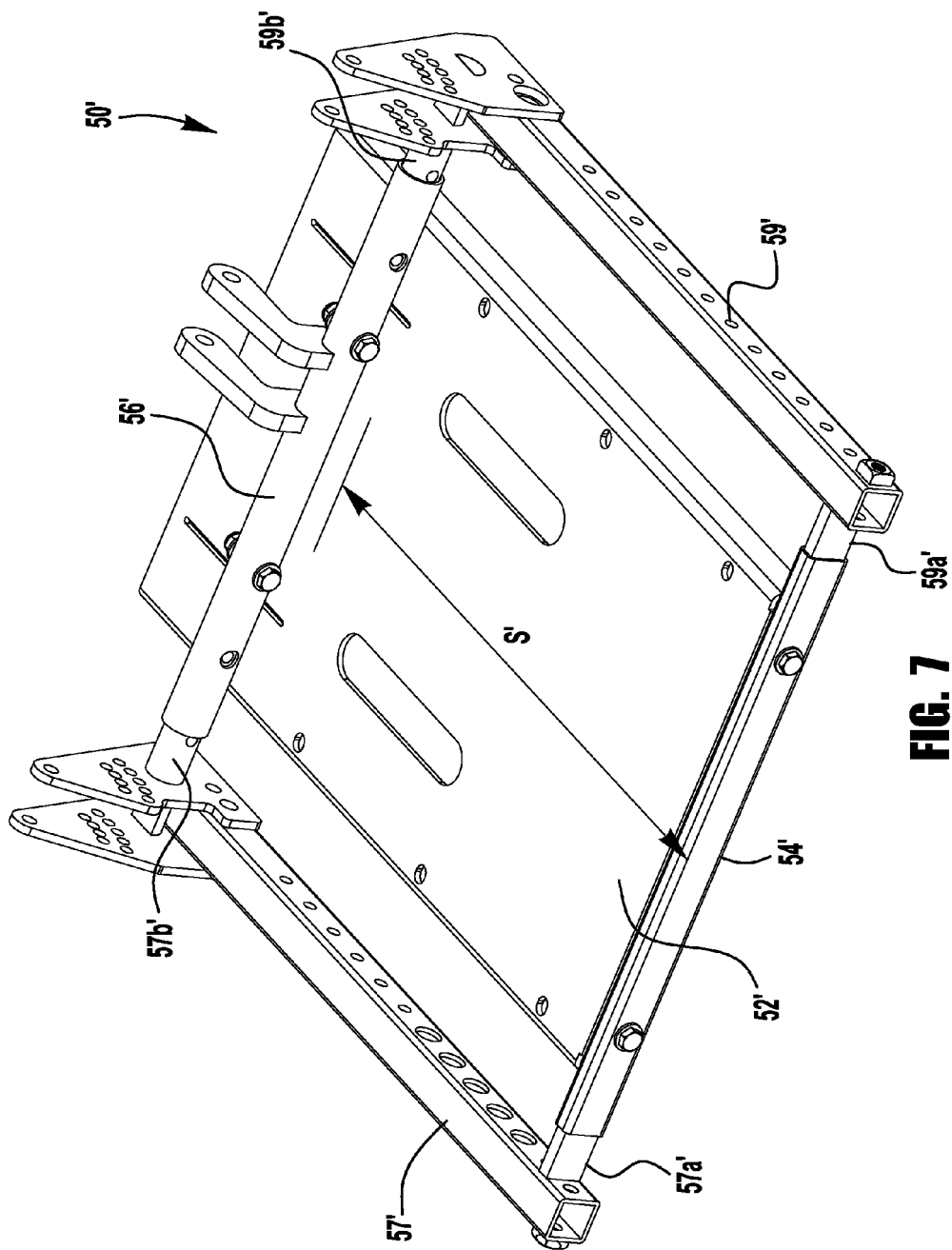
FIG. 7 is an upper perspective view of another low profile seat frame, in accordance with an exemplary embodiment.

In another exemplary embodiment, as shown in FIG. 7, a low profile seat frame 50' may utilize a narrower front frame member 54' secured to the front of the support plate 52', to further limit the portion of the seating area S' extending beyond the front of the positioning module (not shown), for example, to reduce the resulting load on the positioning module by the occupant of the wheelchair. In an exemplary embodiment, the front frame member 54' may be formed from a 1" by ½" rectangular tube, for telescoping engagement with front arm extensions 57a', 59a' of the side frame members 57', 59'. The rear frame member 56', being positioned behind the seating area S' may, but need not, utilize a wider component (e.g., a 1" diameter cylindrical tube).

In an exemplary method of installing a positioning module 105 on a wheelchair 100, the positioning module 105 is assembled to a chassis 101 (FIG. 6B) of the wheelchair. A low profile seat frame 150 is provided, and includes a support plate 152 having opposed upper and lower surfaces, a front frame member 154 secured to a front end of the support plate 152 and extending beyond the lower surface of the support plate, and a rear frame member 156 secured to the upper surface of the support plate at a rear end of the support plate 152. The low profile seat frame 150 is secured to the positioning module 105, such that the support plate 152 spans the seating area of the positioning module and the front frame member 154 overhangs a front edge of the seating area. First and second side frame members 157, 159 are assembled with the front and rear frame members 154, 156 by inserting front extension arms 157a, 159a of the first and second side frame members 157, 159 into hollow ends of the front frame member 154, and inserting rear extension arms 157b, 159b of the first and second side frame members into hollow ends of the rear frame member 156. The side frame members are telescopically adjusted with respect to the front and rear frame members to define a desired width of a seating area, and the side frame members are secured in the selected positions (e.g., using fasteners assembled with the front and rear frame members). A backrest assembly 170 is secured to the rear frame member 156 (e.g., using brackets 171), and a leg rest assembly 180 is secured to the side frame members 157, 159 (e.g., using a support bar 181 installed between the side frame members and mounting brackets 182 secured to the support bar). A seat (e.g., a seat pan and seat cushion, shown schematically in phantom at 190) is secured to the support plate 152 (e.g., using fasteners).

Figure 8A:
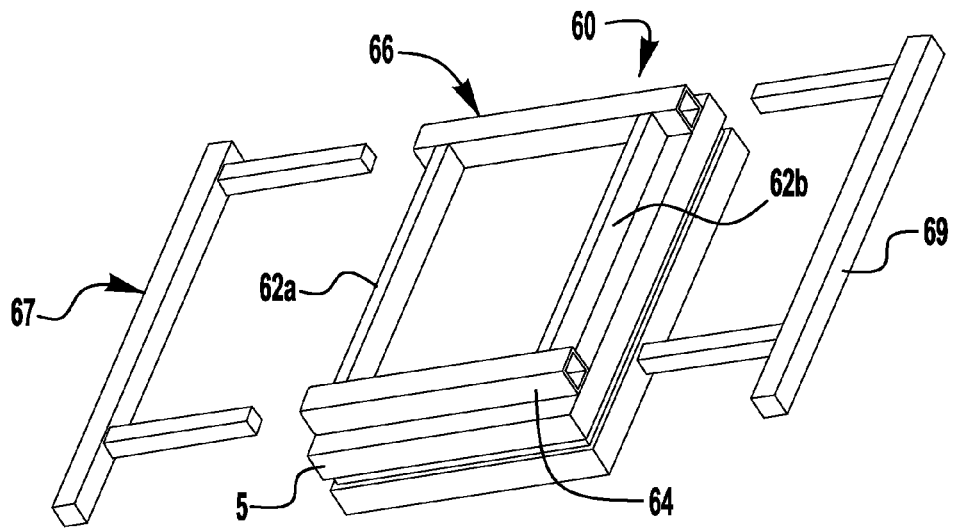
FIG. 8A is an upper perspective view of a seat frame assembled with a positioning module and shown with telescoping side members separated from the seat frame.
Figure 8B:
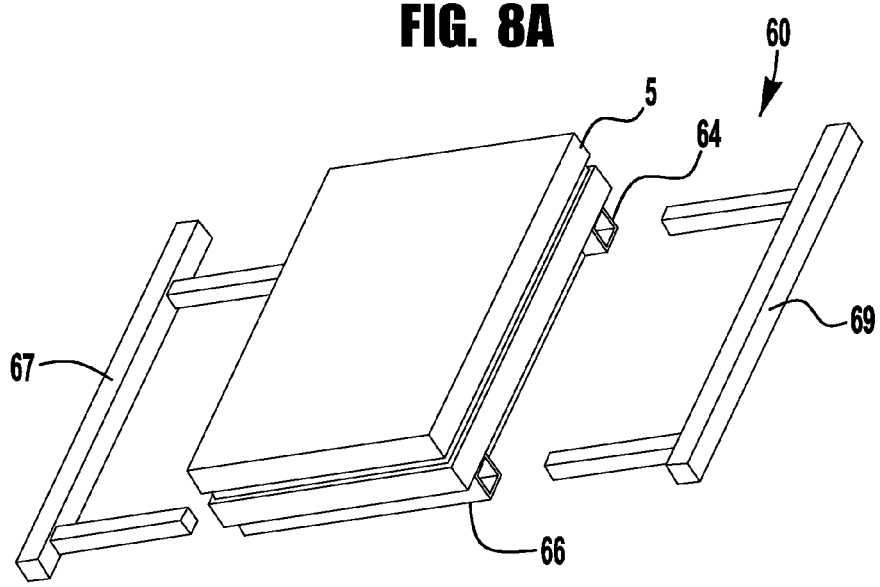
FIG. 8B is a lower perspective view of the seat frame and positioning module assembly of FIG. 8A, shown with the telescoping side members separated from the seat frame.
Figure 8C:
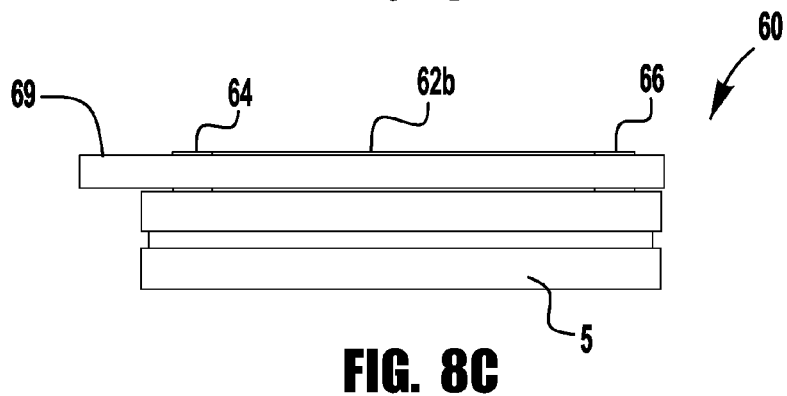
FIG. 8C is a side view of the seat frame and positioning module assembly of FIG. 8A.

FIGS. 8A, 8B, and 8C illustrate a positioning module 5 assembled with an exemplary seat frame 60 having telescoping side frame members 67, 69 and utilizing a conventional non-low profile configuration. As shown, the tubular front and rear frame members 64, 66 and connecting cross bars 62a, 62b are all disposed directly on the upper surface of the positioning module 5, creating a higher profile or elevated seating area.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

I claim:

1. A wheelchair comprising:
a chassis;
a positioning module mounted to an upper portion of the chassis, the positioning module being operable to adjust at least one of an angular position and an elevational position of a seating area of the positioning module;
a seat frame comprising:
a support member secured to and spanning the seating area of the positioning module; and
a front frame member secured to a front end portion of the support member and overhanging a front edge of the seating area of the positioning module, such that the seat frame at least partially straddles the positioning module, the front frame member being connected with and at least partially supporting at least one of a side frame member, foot rest, leg rest and arm rest assembled with and supported by the front frame member; and
a seat secured to an upper surface of the support member;
wherein an upper surface of the front frame member does not extend above an upper surface of the support member.

2. The wheelchair of claim 1, wherein the seat frame further comprises a rear frame member secured to an upper surface of the support member along a rear end of the support member.

3. The wheelchair of claim 2, wherein the seat frame further comprises first and second side frame members assembled with the front and rear frame members to define a width of the seat frame.

4. The wheelchair of claim 3, wherein the first and second side frame members are spaced apart from the support member.

5. The wheelchair of claim 1, wherein the support member comprises a plate.

6. The wheelchair of claim 1, wherein the front frame member is secured to a front edge of the support member.

7. The wheelchair of claim 6, wherein the support member includes a downward extending front flange at the front edge of the support member, the front frame member being secured to the front flange.

8. The wheelchair of claim 1, wherein the upper surface of the front frame member is recessed from the upper surface of the support member.

9. The wheelchair of claim 1, wherein the upper surface of the front frame member is substantially aligned with the upper surface of the support member.

10. A wheelchair comprising:
a chassis;
a positioning module mounted to an upper portion of the chassis, the positioning module being operable to adjust at least one of an angular position and an elevational position of a seating area of the positioning module;
a seat frame comprising:
a support member secured to and spanning the seating area of the positioning module; and
a front frame member secured to a front end portion of the support member and overhanging a front edge of the seating area of the positioning module, such that the seat frame at least partially straddles the positioning module, the front frame member being connected with and at least partially supporting at least one of a side frame member, foot rest, leg rest and arm rest assembled with and supported by the front frame member; and
a seat secured to an upper surface of the support member;
wherein the support member has a maximum height that is smaller than a maximum height of the front frame member.

11. The wheelchair of claim 10, wherein an upper surface of the front frame member is aligned with or recessed from an upper surface of the support member.

12. The wheelchair of claim 10, wherein the front frame member is secured to a frontmost end surface of the support member.

13. A wheelchair comprising:
a chassis;
a positioning module mounted to an upper portion of the chassis, the positioning module being operable to adjust at least one of an angular position and an elevational position of a seating area of the positioning module;
a seat frame comprising:
a support member secured to and spanning the seating area of the positioning module; and
a front frame member secured to a front end portion of the support member and overhanging a front edge of the seating area of the positioning module, such that the seat frame at least partially straddles the positioning module, the front frame member being connected with and at least partially supporting at least one of a side frame member, foot rest, leg rest and arm rest assembled with and supported by the front frame member; and
a seat secured to an upper surface of the support member;
wherein the support member includes at least first and second downward extending flanges sized to closely receive the positioning module therebetween.

14. The wheelchair of claim 13, further comprising first and second side frame members assembled with the front frame member and spaced apart from the support member.

15. The wheelchair of claim 13, wherein the front frame member is secured to a frontmost end surface of the support member.

16. A method of installing a positioning module on a wheelchair, the positioning module being operable to adjust at least one of an angular position and an elevational position of a seating area at least partially defined by an upper surface of the positioning module, the method comprising:

assembling the positioning module to a chassis of the wheelchair;

providing a low profile seat frame including a support plate having opposed upper and lower surfaces, a front frame member secured to a front end portion of the support plate and extending beyond the lower surface of the support plate, and a rear frame member secured to the upper surface of the support plate at a rear end of the support plate;

securing the low profile seat frame to the positioning module, such that the support plate spans the seating area of the positioning module, and the front frame member overhangs a front edge of the seating area;

assembling at least one of a side frame member, a foot rest, a leg rest, and an arm rest with the front frame member; and securing a wheelchair seat to the upper surface of the support plate.

17. The method of claim 16, further comprising assembling first and second side frame members with the front and rear frame members to define first and second side edges of the seating area.

18. The method of claim 16, wherein the support plate includes first and second downward extending side flanges, and wherein securing the low profile seat frame to the positioning module comprises receiving the positioning module between the first and second side flanges.

19. The method of claim 16, further comprising securing a leg rest assembly to the front frame member and securing a backrest assembly to the rear frame member.

20. The method of claim 16, wherein securing the low profile seat frame to the positioning module and securing the wheelchair seat to the upper surface of the support plate comprise installing fasteners assembled with the wheelchair seat through mounting holes in the support plate and securing the fasteners to the positioning module.

* * * * *